April 5, 1966     R. J. PRESTON ETAL     3,244,889
PHOTOSENSITIVE TRACKER WITH SPECIAL X AND Y AXIS PHOTOCELLS
HAVING PLURALITIES OF PARALLED ELECTRODES
Filed July 6, 1961
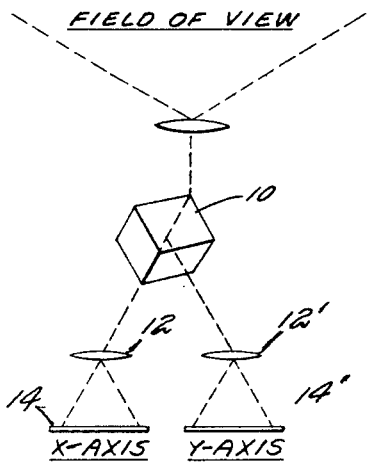
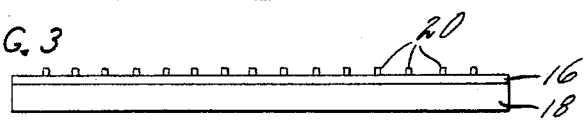
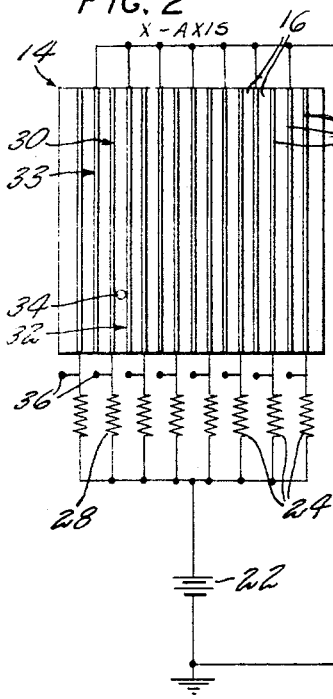
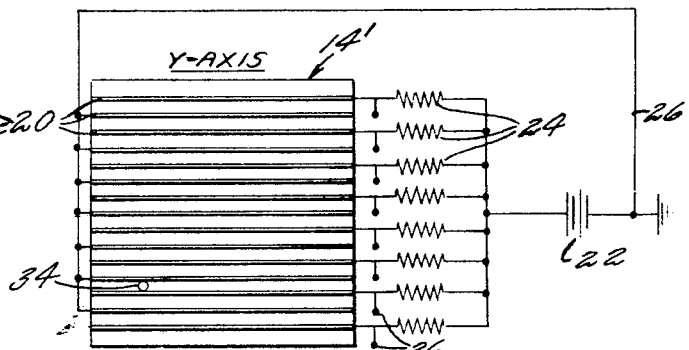
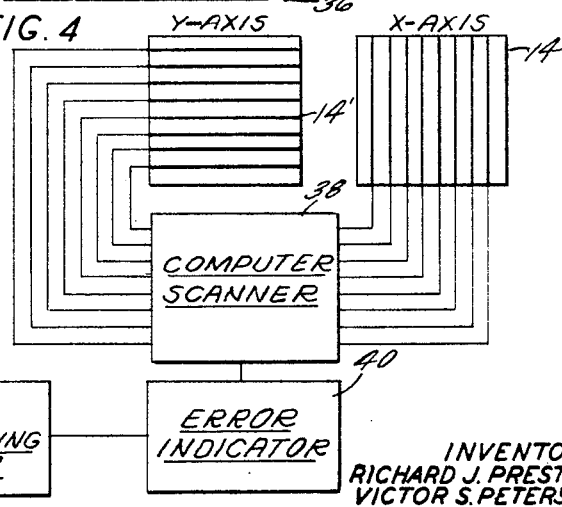
INVENTORS
RICHARD J. PRESTON
VICTOR S. PETERSON
BY Donald F. Bradley
AGENT

United States Patent Office 3,244,889
Patented Apr. 5, 1966

3,244,889
PHOTOSENSITIVE TRACKER WITH SPECIAL X AND Y AXIS PHOTOCELLS HAVING PLURALITIES OF PARALLEL ELECTRODES
Richard J. Preston and Victor S. Peterson, Springfield, Mass., assignors to United Aircraft Corporation, East Hartford, Conn., a corporation of Delaware
Filed July 6, 1961, Ser. No. 122,253
1 Claim. (Cl. 250—211)

This invention relates to a novel energy responsive detector and in particular to an electrical-optical system for deriving position signals defining the location of a radiant body such as a star.

The position of celestial bodies in the heavens is an important reference for navigational purposes. Many advanced missile and aircraft guidance systems use the stars to provide precise information as to position. For example, it may be decided to follow one or more stars during a particular flight. The detector of this invention is capable of being fixed on a particular star or group of stars and following the stars during a mission. Another application of this invention is that of providing an indication of the error between the assumed location of a star in the heavens and the actual location of the star, thereby producing accurate position and direction information for a guidance system.

Specifically, a telescope or other viewing system is directed towards the sky. An optical system forms an optical image of the field of investigation, and the image is focused upon a photoconductive material or phototube. A series of spaced conductive grids are connected across the face of the photoconductive material. A source of electrical potential such as a battery is connected to the grids to form a plurality of conductive electrical circuits through the photoconductive material, and a resistor or other electrical impedance is connected in series with each of the circuits. When the image of a start or other radiant body is projected on the photoconductive material, the impedance of the photoconductive material is lowered to thus provide a low impedance path through the photoconductive material for the battery current. The voltage drop across the resistor is thereby varied as a function of the intensity of the radiant energy falling upon the photoconductive material, and the position of the star image may be determined by means of the change in voltage.

It is therefore an object of this invention to provide an electro-optical device which receives radiations emitted from a radiant body and provides signals which are a function of the coordinates and intensity of the body.

Another object of this invention is a novel energy responsive detector which will provide position signals as a function of the location and intensity of a radiant body.

A further object of this invention is a novel star tracking device which utilizes the conductive properties of a photosensitive material to determine the position of a star.

These and other objects and a fuller understanding of this invention may be had by referring to the following specification and claim, read in conjunction with the drawings, in which:

FIG. 1 is a schematic diagram of the optical system of this invention;

FIG. 2 is a schematic view of the detector and its circuitry;

FIG. 3 is a side view of the detector of FIG. 2; and

FIG. 4 is a block diagram of a system utilizing the detector.

Referring more particularly to FIG. 1, in which is shown schematically the optical system of the invention, a sighting apparatus, which may be a telescope, is directed toward a field which contains at least one radiant body such as a star. The sky area subtended by the angle visible to the sighting structure is directed through a beam splitter which may be a prism 10 or other device for splitting the projected image of the field of view into two separate areas. Focusing lenses 12 and 12' will project the images upon two detectors 14 and 14' which will be referred to as the X-axis detector and the Y-axis detector.

FIGURES 2 and 3 show in detail the structure of the X and Y-axis detectors. In FIG. 3, a layer of photoconductive material 16 is deposited on or attached to a base material 18. The base 18 may be any non-conducting material having relative rigidity, and may be a flat metallic plate. A series of electrically conductive grids 20 are positioned in conductive relation with the layer of photoconductive material 16. The grids 20 may be deposited on the photoconductive layer 16 by any well-known means including printed circuit techniques or electron gun techniques. The grids may be metallic strips such as copper. FIGURE 2 shows schematically the X and Y-axis detectors, in which the Y-axis detector is rotated 90° from the X-ray detector relative to the projected image to provide position data for two axes. With the particular optical system shown, a total of 1800 grids or lines per coordinate will give a resolution of approximately 4 seconds of arc. 1800 lines will produce 900 location coordinates.

Referring now more particularly to the detectors of FIG. 2, a source of potential such as battery 22 is connected with alternate grids through an impedance illustrated as resistors 24. The remaining grids are joined together by a common line 26 and may be returned to the other side of the battery 22, or a common terminal. A plurality of electrically conductive circuits have thus been produced, as for example, from the positive terminal of battery 22 through resistor 28 to grid 30, through the photoconductive material 16 to grids 32 and 33 and back through line 26 to the negative side of the battery 22.

If an image of a radiant body, such as a star, has been projected on the X and Y-axis detectors such as at 34, the conduction characteristics of the photoconductive material will be changed so that the portion of the photoconductive material on which the star image is projected will become more conductive and will act substantially as a low impedance between grid 30 and grid 32. Since the voltage drop across any of the circuits is fixed at the potential of battery 22, and the total circuit impedance has been decreased, a larger current will flow. This will cause a greater voltage drop across fixed resistor 28. If output terminals such as at 36 are used to sense the voltage drop across the resistors, the voltage of the grid corresponding to a star image location will be much lower than at the other terminals. If the same image is projected on both X and Y-axis detectors, the star may be located within the field of view my means of the signals produced at the output terminals of the X and Y-axis detectors.

In FIG. 4 a typical system utilizing the detector information is shown. A computer scanner 38 may be programmed in advance with information relative to a predicted star position. If the output terminals of the X and Y-axis detectors are connected with the computer, the terminals may be scanned to determine the output voltages and thus the position of the star image on each detector. For example, the output voltages from each resistor output terminal 36 from both X and Y-axis detectors may be fed through "and" gates to a storage or buffer register containing one binary element for each output terminal. The binary element would preferably be a magnetic core or a flip-flop.

The output from each terminal 36 is a voltage level. Initially when there is no star image falling on the detector, the impedance across the photoconductive material between adjacent grids is quite high, and little voltage drop occurs across each series resistor 28. At this time the voltage at each terminal 36 is highly positive and only slightly below the source voltage 22 because little voltage drop occurs across resistors 24. When a star image appears on the detector matrix, the photoconductive material becomes highly conductive, and its impedance drops. The voltage at the terminal 36 corresponding to the location of the star image on the detector also drops, the voltage being positive but much lower than the source voltage 22. The exact voltage at any terminal will depend upon the intensity of the star image, a brighter star causing higher conduction of the photoconductive material and a lower voltage at the terminal 36.

If each terminal 36 is connected through a diode "and" gate to a binary magnetic core, and all "and" gates are sampled by a computer gating pulse at the same time, the binary cores would contain data indicative of the presence or absence of a star image at or above a certain predetermined magnitude of brightness. Each core would be biased independently to one selected remnant state where it would remain until switched to the opposite state by the presence of a preselected star image voltage on its terminal 36.

Gating of all diode "and" gates would take place simultaneously by a timing pulse from the computer to each diode, thereby rendering each diode conductive so the voltage at terminal 36 will be passed to each core at the proper time.

The cores could be biased such that they would switch only upon the presence of a voltage indicative of a preselected star magnitude, i.e., a high positive voltage at any terminal 36 would be insufficient to switch the core, whereas a lower voltage would cause a change in state. The bias voltage could be varied to select the voltage and therefore the star intensity at which the change in state occurred.

Upon occurrence of the gating pulse, all cores would either remain in their original remnant state, thus indicating that no star image of a certain magnitude is present on the selected grid, or switch to the other state, thus indicating presence of such a star image. This data in the form of binary digits could then be transferred into permanent computer storage by well-known computer techniques, or sampled while in the buffer register. From the accumulated data the computer could determine presence and location of one star or a series of stars. When a desired star or stars are located by comparing their magnitude and position with data stored in the computer, any error between their actual location and desired location relative to the star tracker may be computed and transferred to error indicator 40. A servo positioning system or motor 42 may then utilize the error data to drive a telescope positioning device or other mechanism to bring the star under consideration to the proper position on the grid axes. The movement necessary to properly position the star will be a measure of the position error, and in this way, the system may be utilized as a star tracker.

Another use of this invention would be to provide the error indication to a computer which will thereupon accurately compute the location of the star for navigational purposes.

It is apparent that this invention need not be limited to the viewing of one star but may be used to detect or follow two or more stars. If for example, accurate navigational information is desired, two or more stars of first, second, or third order magnitude located in a particular segment of the heavens may be used for navigational or star tracking purposes. The field of view will be a function of the particular use to which the invention is put. If extremely accurate position information is desired for one star, the field of view may be limited to two or three degrees of arc in the heavens. However, a much greater field of view may be necessitated if a plurality of stars are to be used. The optics of the system, the size of the star image on the grids, and the number and relative separation of the grids may also be varied to suit the particular application.

It is obvious that if a relatively large field of view is used, other stars within the field of view will also be projected on the X and Y-axis detectors. Since the conductivity of photoconductive material is a function of the intensity of the star image projected thereon, the signals at the output terminals will vary with the magnitude of the stars projected on the detector. By well-known programming techniques the location of the brightest stars can easily be recognized, and accurate position information can thereby be obtained utilizing two or more stars.

Photoconductive materials exhibit better electrical response at low temperatures than at high temperatures, so that any cooling apparatus might be used to provide the low temperatures. For example, cryogenic means could be included with the detector, or, for use in space applications, the detector apparatus could be cooled by the atmosphere.

A photomultiplier tube may also be used as the detector. The grids are placed within the glass envelope of the tube across the face of the photoconductive material, and the grid outputs connected to pins positioned at the side of the tube. This arrangement would take advantage of the amplification of the light signals performed by the tube itself, reduce the dark current noise and increase the sensitivity of the system.

This invention may also be used to accurately indicate the position and intensity of other radiating bodies. For example, in radio prospecting for uranium or other radioactive deposits, the precise center of the anomaly may be located by focusing the radiation from a wide area upon a scintillation crystal. If a phototube or photosensitive detector having the lined grids of this invention is placed adjacent the scintillation crystal, the light energy produced by the radiation in the crystal will actuate the detector and the position and intensity of the ore body may then be determined. Other applications of this invention would be for locating nuclear blasts, radiation for reactor and isotope research, flux mapping, magnetic and electrical field plotting, neutron cross-section studies, scattering effects, beta energy distribution with a stillene scintillator, and monoenergetic gamma source emission distribution (either random, 4 pi or directional). An important application is in the medical electronics field, where the position and velocity of radio tracers in the body could be measured.

It is obvious that both the X and Y-grids could be deposited upon a single detector rather than providing separate X and Y-axis detectors, but such a configuration would involve insulating problems. Further, other parameters such as flow, mechanical position, pressure, temperature or level may be converted into light signals for static measurement purposes. Many other modifications and changes may be made by those skilled in the art without departing from the scope of this invention.

We claim:

Apparatus for determining the location and intensity of a radiant body comprising optical means for forming an image of said body, first and second detectors having a continuous layer of photoconductive material applied across a substantially flat insulator, a plurality of spaced longitudinally extending conductive grids connected across the face of said insulator in contact with said photoconductive material, said detectors being positioned relative to the focused image so that the grids connected across said first detector are mutually perpendicular to the grids across said second detector, a source of potential, means to connect said source of potential across adjacent grids on each detector to thereby provide a plurality of conductive circuits, each circuit comprising adjacent grids and the portion of the photoconductive material spaced therebetween, and a plurality of resistors each connected between said potential source and one of said alternate grids.

References Cited by the Examiner

UNITED STATES PATENTS

| | | | |
|---|---|---|---|
| 2,789,193 | 4/1957 | Anderson | 338—17 |
| 2,937,353 | 5/1960 | Wasserman | 338—15 |
| 2,955,777 | 10/1960 | Null et al. | |
| 2,966,823 | 1/1961 | Trimble | 250—220 |
| 2,981,842 | 4/1961 | Kaufold et al. | |
| 3,026,417 | 3/1962 | Tomlinson | 250—211 |
| 3,067,283 | 12/1962 | Petritz et al. | 250—83.3 |

RALPH G. NILSON, *Primary Examiner.*

KATHLEEN CLAFFY, MAYNARD R. WILBUR, CHESTER L. JUSTUS, *Examiners.*

M. A. LEAVITT, *Assistant Examiner.*